Nov. 25, 1924.  
E. TIECK  
1,517,132  
COMBINED CAN OPENER AND SPOUT  
Filed Nov. 17, 1922
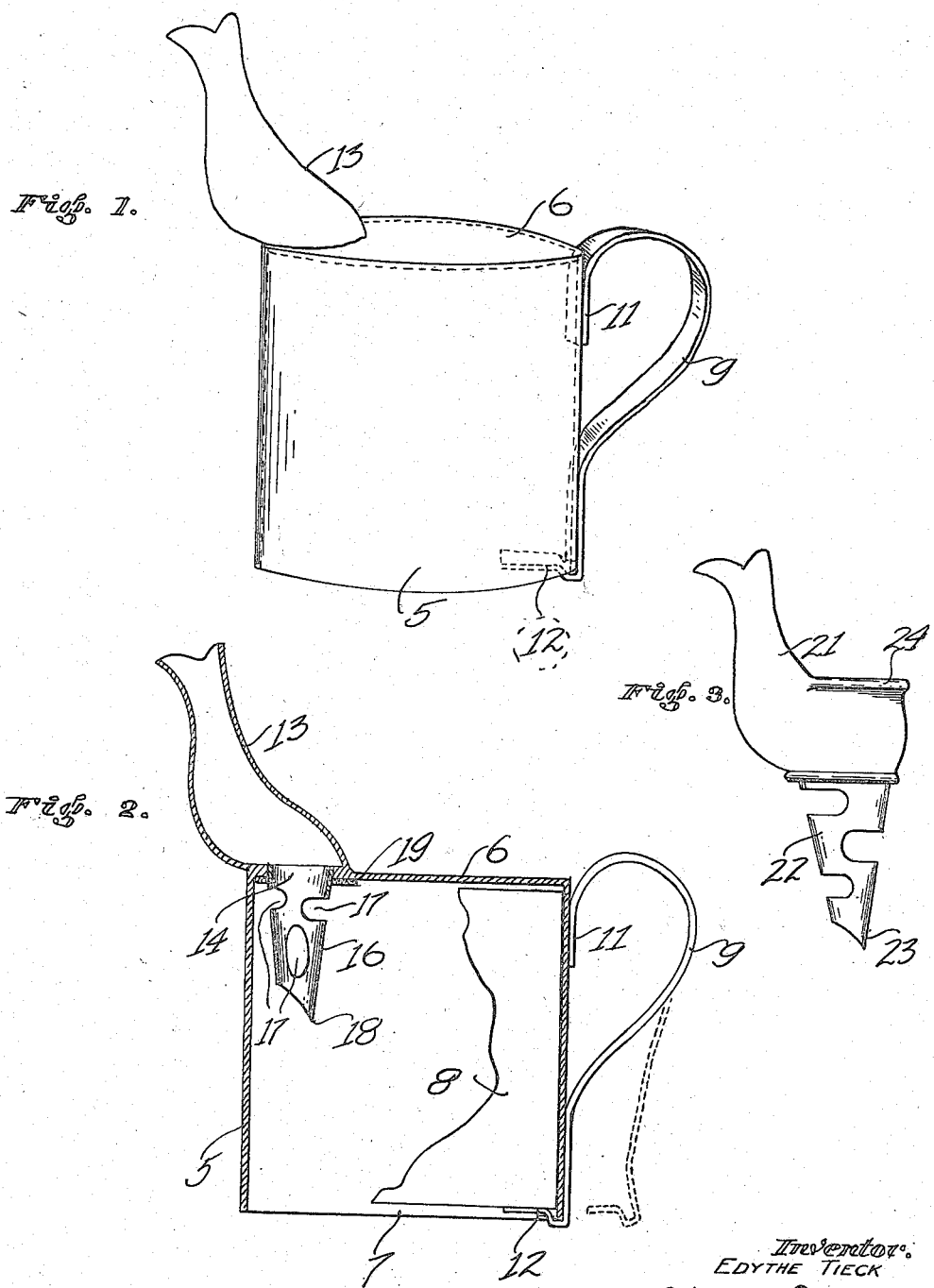
Inventor:  
EDYTHE TIECK  
Victor J. Evans  
Attorney.

Patented Nov. 25, 1924.

1,517,132

UNITED STATES PATENT OFFICE.

EDYTHE TIECK, OF LOS ANGELES, CALIFORNIA.

COMBINED CAN OPENER AND SPOUT.

Application filed November 17, 1922. Serial No. 601,539.

*To all whom it may concern:*

Be it known that I, EDYTHE TIECK, a citizen of the United States, residing at Los Angeles, in the county of Los Angeles and State of California, have invented new and useful Improvements in Combined Can Openers and Spouts, of which the following is a specification.

This invention relates to improvements in containers for canned milk, the principal object of which is to provide a container which may be placed over a can of evaporated or condensed milk so that the same will present a neat appearance, and at the same time to protect the can while not in use.

Another object is to provide a device of this character which automatically punctures the can thereby obviating the necessity of using an ordinary can opener.

A further object is to prevent the spilling of the contents of the can by employing a suitable gasket between my device and the ordinary can thereby preventing leakage.

Other objects and advantages will be apparent during the course of the following description.

In the accompanying drawings forming a part of this specification, and in which like numerals are employed to designate like parts throughout the same, Figure 1 is a perspective view of my device showing a can of milk in dotted lines, Figure 2 is a vertical cross-section through my device, and Figure 3 is a modified form of separate spout.

In the use of canned milk, it is customary to punch two holes in the top of the can, one for the milk to pour through, and the other for the admission of air to the can, and unless these holes are protected, they provide easy access for foreign substances. At the same time, the placing of a can of this nature upon the table presents an unsightly appearance, and it is to overcome these objections that I have devised my invention, wherein it will be noted that the numeral 5 designates a cylindrical member having a closed top 6 and provided with an open bottom as shown at 7, through which the can 8 may be inserted. At 9, I have shown a handle which is secured at 11 to the cylindrical member 5 and is provided at its bottom with a bent portion 12. This bent portion is adapted to underlie the bottom of the can 8, thus serving to retain the same within my device. The handle 9 is made of spring metal so that it may be sprung to the dotted line position while an old can is being removed and a new can inserted.

At 13, I have provided a spout, which spout is positioned directly above a port 14 formed in the top 6. Surrounding the port 14 and extending downwardly therefrom is a cutting member 16 which is provided with orifices 17 through which the contents of the can may pass. This cutting member is provided with a sharp point 18 so that the can may be easily punctured.

At 19, I have shown a gasket adapted to be positioned around the cutting member so as to lie between the top 6 and the top of the milk can.

In Figure 3, I have shown a modified form, which comprises a spout 21 having a cutting element 22 positioned thereon. This spout may be pressed downwardly on the top of the can so that the point 23 will puncture the metal, after which the whole cutting element will easily enter the can.

It will thus be seen that I have provided a very cheap and useful device which may be placed over a can of milk and pressed downwardly thereon with the result that the cutting element will puncture the can and extend thereinto until the gasket 19 contacts with the top of the can, after which time the lower portion 12 of the handle is caused to spring beneath the can thereby preventing its dropping from my device.

The operation of the modified form shown in Figure 3 is similar with the exception that I have provided a flat portion 24 upon which pressure may be applied in order that the cutting element may be easily forced into the can.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, the combination with a cylindrical member, a spout formed integral therewith, a port extending from said spout into said cylindrical member, a handle secured to said cylindrical member, said handle having a bent portion extending beneath said cylindrical member, said handle being movable so as to allow the entrance of a can within the cylindrical member and a cutting element positioned beneath said port, said cutting element having openings formed therein for the purpose of permitting fluid to pass therethrough to said port.

In testimony whereof I affix my signature.

EDYTHE TIECK.